(No Model.)
J. W. GRAY.
RUBBER TUBE FOR SYRINGES, &c.
No. 315,023. Patented Apr. 7, 1885.
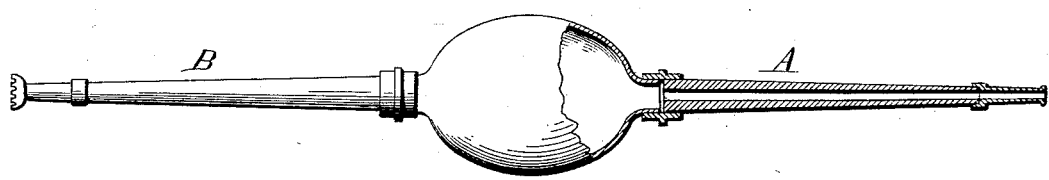
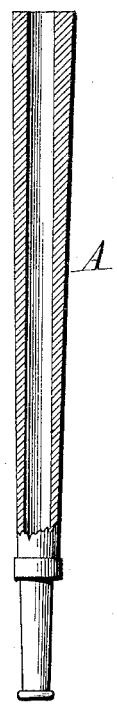
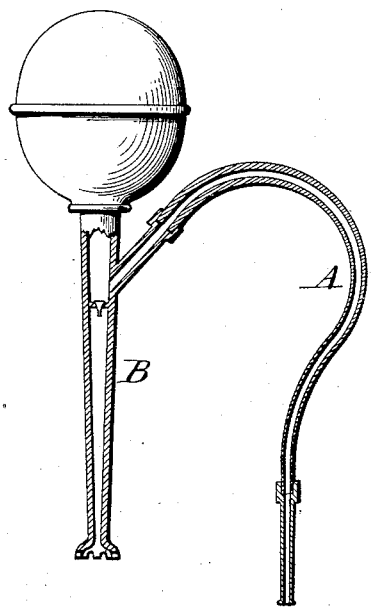
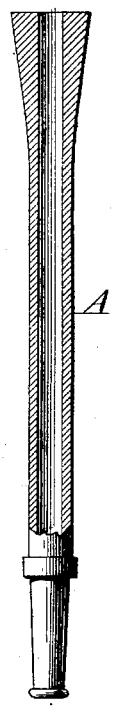

UNITED STATES PATENT OFFICE.

JOHN W. GRAY, OF HARTFORD, CONNECTICUT.

RUBBER TUBE FOR SYRINGES, &c.

SPECIFICATION forming part of Letters Patent No. 315,023, dated April 7, 1885.

Application filed December 30, 1884. (No model.)

*To all whom it may concern:*

Be it known that I, JOHN W. GRAY, of Hartford, in the county of Hartford and State of Connecticut, have invented certain new and useful Improvements in Syringes and Similar Instruments, of which the following is a specification.

My invention relates to rubber tubes for syringes and similar purposes; and the invention consists in making the tube of a gradually-increasing thickness toward the end where it is attached or connected to the syringe or other article, as hereinafter more fully set forth.
Figure 1 is a side view of a syringe with one of its tubes shown in section. Fig. 2 is a similar view of another form of the same. Fig. 3 is a longitudinal section of one of the tubes detached and enlarged, and Fig. 4 a section of a modification of the same.

In making syringes which have a flexible bulb it has always been customary to make the flexible rubber tubes attached thereto of uniform size and thickness throughout their entire length, they being composed simply of pieces of ordinary rubber tubing, which is made up in pieces of any convenient length and then cut to the length required for the syringe; or, if made of the required length to fit the syringe in the first instance, as they obviously may be, still they are of uniform thickness and diameter throughout. These syringes are usually packed in boxes or cases, which are of such size that the tubes have to be bent or folded more or less in order to get them in the box, and the result is that the tubes are almost certain, sooner or later, to collapse at the point where they are bent, near the bulb, and after awhile the tube is liable to crack or break at that point, and thus render the syringe useless. It is frequently the custom, also, when these syringes are kept in a room, to take them from the box or case and hang them upon a couple of nails or hooks, the tubes resting on one nail or hook on each side of the bulb, and, when so hung, the weight of the projecting ends of such tubes causes them to bend and collapse at or near the nails or hooks, and as the rubber becomes dry and hard they almost invariably crack or break at those points, thereby rendering the syringe useless. To obviate this difficulty, I make the tube A as shown in the drawings—that is, of a gradually-increasing thickness from its extremity or free end to the end attached to the bulb, as shown more clearly in Fig. 3. By this construction the tubes are so strengthened and stiffened that when either bent to fit in the box or casing or hung up, as before described, they are made to assume a general curve, and are prevented from collapsing and cracking, and thus by this simple improvement they are rendered far more durable, and the life and utility of the syringe is greatly prolonged.

In some cases these syringes are made with a flexible tube at each side of the bulb, as shown in Fig. 1, in which case both tubes A and B will be thus made. In other cases these syringes are made, as represented in Fig. 2, with one short rigid tube, B, usually of metal, and one longer flexible tube, A, in which case the latter will be made of increasing thickness, as described. The same result may be accomplished by increasing the thickness of the walls of the tube for a part of its length only, as shown in Fig. 4, where it is shown increased for a short distance only from the point of its attachment to the bulb, the remaining portion of the tube being of uniform thickness. The extent to which this increased thickness shall extend is merely a question of degree, and may be more or less according to circumstances, care, however, being taken to apply the increased thickness at those points of the tube which are more liable to be injured by being bent abruptly in packing it in the case or hanging it upon supports, as stated. I prefer, however, to make the tube or tubes of gradually-increasing thickness, because they will be easier to manufacture, and because, also, they will have a neater and more symmetrical appearance when made.

The invention is equally applicable to rubber tubes attached to shower-baths, and in all cases where the tube is attached at one end to a fixture in such a manner that the weight of the tube when allowed to hang suspended will cause the ordinary rubber tube to collapse or bend abruptly, and thus cause it to crack or fracture where bent.

A person skilled in the manufacture of rubber goods will readily understand how to make these improved tubes, and it is therefore unnecessary to give further directions therefor.

Having thus described my invention, what I claim is—

A rubber tube, A, for syringes or similar uses, having its walls made of increasing or varying thickness toward the point where it is attached, substantially as shown and described.

JOHN W. GRAY.

Witnesses:
F. A. FISHER,
A. H. LYMAN.